(12) United States Patent
Konno

(10) Patent No.: US 10,400,191 B2
(45) Date of Patent: Sep. 3, 2019

(54) REFRIGERATING MACHINE OIL, AND WORKING FLUID COMPOSITION FOR REFRIGERATING MACHINES

(71) Applicant: JXTG Nippon Oil & Energy Corporation, Tokyo (JP)

(72) Inventor: Souichirou Konno, Tokyo (JP)

(73) Assignee: JXTG Nippon Oil & Energy Corporation, Tokyo (JP)

( * ) Notice: Subject to any disclaimer, the term of this patent is extended or adjusted under 35 U.S.C. 154(b) by 191 days.

(21) Appl. No.: 15/310,398

(22) PCT Filed: May 11, 2015

(86) PCT No.: PCT/JP2015/063449
§ 371 (c)(1),
(2) Date: Nov. 10, 2016

(87) PCT Pub. No.: WO2015/178233
PCT Pub. Date: Nov. 26, 2015

(65) Prior Publication Data
US 2017/0218292 A1    Aug. 3, 2017

(30) Foreign Application Priority Data

May 22, 2014  (JP) ................. 2014-106547

(51) Int. Cl.
*C10M 107/28* (2006.01)
*C09K 5/04* (2006.01)
*C10M 171/00* (2006.01)

(52) U.S. Cl.
CPC ............ *C10M 107/28* (2013.01); *C09K 5/04* (2013.01); *C10M 171/008* (2013.01); *C10M 2207/026* (2013.01); *C10M 2207/042* (2013.01); *C10M 2207/281* (2013.01); *C10M 2209/0845* (2013.01); *C10M 2223/041* (2013.01); *C10N 2220/021* (2013.01); *C10N 2220/302* (2013.01); *C10N 2220/303* (2013.01); *C10N 2220/306* (2013.01); *C10N 2230/02* (2013.01); *C10N 2230/06* (2013.01); *C10N 2230/08* (2013.01); *C10N 2230/70* (2013.01); *C10N 2240/30* (2013.01)

(58) Field of Classification Search
CPC .................. C10M 171/008; C10M 107/28
See application file for complete search history.

(56) References Cited

U.S. PATENT DOCUMENTS

| 5,017,300 A | 5/1991 | Reynolds |
| 5,691,284 A | 11/1997 | Beyer et al. |
| 2011/0057146 A1 | 3/2011 | Kaneko et al. |
| 2011/0117725 A1 | 5/2011 | Parekh et al. |
| 2012/0223269 A1 | 9/2012 | Van Horn et al. |

FOREIGN PATENT DOCUMENTS

| CN | 1233622 A | 11/1999 |
| JP | H4-275397 A | 9/1992 |
| JP | H5-320680 A | 10/1993 |
| JP | H10-267437 A | 10/1998 |
| JP | H11-286520 A | 10/1999 |
| JP | 2009-052050 A | 3/2009 |
| JP | 2011-162766 A | 8/2011 |
| WO | WO 2005/105947 | 11/2005 |

OTHER PUBLICATIONS

Machine translation of JPH04275397. (Year: 1992).*
Japanese Patent Office, International Search Report issued in International Application No. PCT/JP2015/063449 (dated Jun. 9, 2015) 1 pg.
Taiwan Intellectual Property Office, Notice of Allowance issued in Taiwanese Patent Application No. 104115789 (dated Feb. 15, 2016) 1 pg.
European Patent Office, Search Report issued in European Application No. 15796869.4 (dated Apr. 13, 2017) 7 pp.
International Bureau of WIPO, International Preliminary Report on Patentability and Written Opinion issued in International Application No. PCT/JP2015/063449 (dated Dec. 1, 2016) 5 pp.
Japan Patent Office, Office Action Issued in Japanese Application No. 2016-521038 (dated Jan. 8, 2019) 6 pp.

* cited by examiner

Primary Examiner — Wenwen Cai
(74) *Attorney, Agent, or Firm* — Leydig, Voit & Mayer, Ltd

(57) ABSTRACT

The present invention provides a refrigerating machine oil comprising, as a base oil, a polymer having a structural unit represented by the following formula (1):

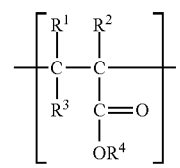

(1)

wherein $R^1$, $R^2$ and $R^3$, which may be the same as or different from each other, represent a hydrogen atom or a hydrocarbon group; and $R^4$ represents a hydrocarbon group or an organic group containing an oxygen atom, and having a number average molecular weight Mn of 300 or more and 3000 or less and a ratio of a weight-average molecular weight Mw to a number average molecular weight Mn (Mw/Mn) of 1.10 or more and 2.00 or less, and the refrigerating machine oil being used with a refrigerant selected from the group consisting of difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide.

10 Claims, No Drawings

REFRIGERATING MACHINE OIL, AND WORKING FLUID COMPOSITION FOR REFRIGERATING MACHINES

CROSS-REFERENCE TO RELATED APPLICATIONS

This patent application is the U.S. national phase of International Application No. PCT/JP2015/063449, filed on May 11, 2015, which claims the benefit of Japanese Patent Application No. 2014-106547, filed May 22, 2014, the disclosures of which are incorporated herein by reference in their entireties for all purposes.

TECHNICAL FIELD

The present invention relates to a refrigerating machine oil, a working fluid composition for a refrigerating machine, use of a composition containing a polymer as a base oil for a refrigerating machine oil or a working fluid composition for a refrigerating machine and use of a polymer for manufacturing a refrigerating machine oil or a working fluid composition for a refrigerating machine.

BACKGROUND ART

Recently, destruction of the ozone layer has been concerned. Due to this problem, CFC (chlorofluorocarbons) and HCFC (hydrochlorofluorocarbons) conventionally used as refrigerants for refrigerating machines become subjects to regulation and alternatively HFC (hydrofluorocarbons) has been increasingly used as a refrigerant. In addition, refrigerants having a lower global warming potential (GWP) than HFC refrigerants have been developed (for example, see Patent Literature 1).

In the meantime, in the cases of using conventional CFC and HCFC as refrigerants, a refrigerating machine oil such as a mineral oil and a hydrocarbon oil including alkyl benzene have been suitably used. Since behaviors of a refrigerating machine oil such as compatibility with a refrigerant, lubricity, dissolution viscosity to the refrigerant and thermal/chemical stability vary depending upon the type of refrigerant used in combination and cannot be expected, a refrigerating machine oil must be developed for every refrigerant.

CITATION LIST

Patent Literature

Patent Literature 1: International Publication No. WO2005/105947

SUMMARY OF INVENTION

Technical Problem

An object of the present invention is to provide a refrigerating machine oil excellent in suitability with a predetermined refrigerant and a working fluid composition for a refrigerating machine using the refrigerating machine oil.

Solution to Problem

The present invention provides a refrigerating machine oil comprising, as a base oil, a polymer having a structural unit represented by the following formula (1):

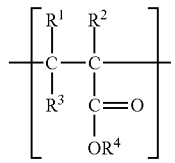

wherein $R^1$, $R^2$ and $R^3$, which may be the same as or different from each other, represent a hydrogen atom or a hydrocarbon group; and $R^4$ represents a hydrocarbon group or an organic group containing an oxygen atom, and having a number average molecular weight Mn of 300 or more and 3000 or less and a ratio of a weight-average molecular weight Mw to a number average molecular weight Mn (Mw/Mn) of 1.10 or more and 2.00 or less, and the refrigerating machine oil being used with a refrigerant selected from the group consisting of difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide.

The present invention also provides a working fluid composition for a refrigerating machine comprising: a refrigerating machine oil comprising, as a base oil, a polymer having a structural unit represented by the above formula (1), and having a number average molecular weight Mn of 300 or more and 3000 or less and a ratio of a weight-average molecular weight Mw to a number average molecular weight Mn (Mw/Mn) of 1.10 or more and 2.00 or less; and a refrigerant selected from the group consisting of difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide.

The present invention also relates to use of a composition comprising a polymer as a base oil for a refrigerating machine oil or a working fluid composition for a refrigerating machine, wherein the polymer has a structural unit represented by the above formula (1), wherein the polymer has a number average molecular weight Mn of 300 or more and 3000 or less and a ratio of a weight-average molecular weight Mw to a number average molecular weight Mn (Mw/Mn) of 1.10 or more and 2.00 or less, wherein the refrigerating machine oil is used with a refrigerant selected from the group consisting of difluoromethane, a mixture of difluoromethane and pentafluoroethane, a mixture of difluoromethane, pentafluoroethane and 1,1,1,2-tetrafluoro ethane, a mixture of pentafluoroethane, 1,1,1,2-tetrafluoro ethane and 1,1,1-trifluoroethane, unsaturated hydrofluorocarbons, hydrocarbons and carbon dioxide, and wherein the working fluid composition for a refrigerating machine comprises a refrigerating machine oil and a refrigerant selected from the group consisting of difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide.

The present invention also provides use of a polymer for manufacturing a refrigerating machine oil or a working fluid composition for a refrigerating machine, wherein the polymer has a structural unit represented by the above formula (1), wherein the polymer has a number average molecular weight Mn of 300 or more and 3000 or less and a ratio of a weight-average molecular weight Mw to a number average molecular weight Mn (Mw/Mn) of 1.10 or more and 2.00 or less, wherein the refrigerating machine oil is used with a refrigerant selected from the group consisting of difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide, and wherein the working fluid composition for a refrigerating machine comprises a refrigerating machine oil and a refrigerant selected from the group consisting of difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide.

Advantageous Effects of Invention

According to the present invention, it is possible to provide a refrigerating machine oil excellent in suitability with a predetermined refrigerant and a working fluid composition for a refrigerating machine using the refrigerating machine oil.

DESCRIPTION OF EMBODIMENTS

The refrigerating machine oil according to the embodiment contains, as a base oil, a polymer (hereinafter also referred to as "(meth)acrylate polymer"), which has a structural unit represented by the following formula (1):

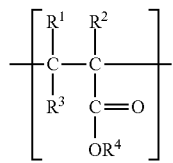

(1)

wherein $R^1$, $R^2$ and $R^3$, which may be the same as or different from each other, represent a hydrogen atom or a hydrocarbon group; and $R^4$ represents a hydrocarbon group or an organic group containing an oxygen atom, which has a number average molecular weight Mn of 300 or more and 3000 or less and a ratio of a weight-average molecular weight Mw to a number average molecular weight Mn, i.e., Mw/Mn, of 1.10 or more and 2.00 or less, and to be used with a refrigerant selected from difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide.

The working fluid composition for a refrigerating machine according to the embodiment contains a refrigerating machine oil containing, as a base oil, a polymer, which has a structural unit represented by the above formula (1), a number average molecular weight Mn of 300 or more and 3000 or less and a ratio of a weight-average molecular weight Mw to a number average molecular weight Mn, i.e., Mw/Mn, of 1.10 or more and 2.00 or less; and a refrigerant selected from difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide. The working fluid composition for a refrigerating machine according to the embodiment includes an aspect containing the refrigerating machine oil according to the embodiment and a refrigerant selected from difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide.

In the formula (1), the number of carbon atoms of the hydrocarbon group represented by each of $R^1$, $R^2$ and $R^3$ is preferably 1 to 8, more preferably 1 to 5 and further preferably 1 to 3. In the formula (1), it is preferable that $R^1$ and $R^3$ are each a hydrogen atom and $R^2$ is a hydrogen atom or a methyl group.

In the formula (1), $R^4$ represents a hydrocarbon group or an organic group containing an oxygen atom. The number of carbon atoms of the hydrocarbon group represented by $R^4$ is preferably 1 to 10, more preferably 1 to 5 and further preferably 1 to 3. In all structural units constituting a (meth)acrylate polymer, an average number of carbon atoms of the hydrocarbon group represented by $R^4$ is preferably 1 to 10, more preferably 1 to 5 and further preferably 1 to 3. Examples of the organic group containing an oxygen atom include a linear or branched hydrocarbon group containing an oxygen atom constituting an ether bond and a hydrocarbon group having a glycidyl group.

It is preferable that —$OR^4$ in the formula (1) is represented by the following formula (2):

(2)

wherein $R^5$ represents a divalent hydrocarbon group or a divalent hydrocarbon group containing an ether-bond oxygen atom; $R^6$ represents a hydrocarbon group; and m represents an integer of 0 or more. If m is 2 or more, a plurality of $R^5$ may be the same as or different from each other.

In the formula (2), the number of carbon atoms of the divalent hydrocarbon group and hydrocarbon group containing an ether-bond oxygen atom which are represented by $R^5$ is preferably 1 to 10, more preferably 1 to 5 and further preferably 1 to 3. In the formula (2), the divalent hydrocarbon group containing an ether-bond oxygen atom which is represented by $R^5$ may be a hydrocarbon group having, for example, an oxygen atom constituting an ether bond at a side chain.

In the formula (2), it is preferable that $R^6$ is a hydrocarbon group having 1 to 20 carbon atoms. Examples of the hydrocarbon group include an alkyl group, a cycloalkyl group, a phenyl group, an aryl group and an arylalkyl group. Of these, an alkyl group is preferable and an alkyl group having 1 to 5 carbon atoms is more preferable.

In the formula (2), m is an integer of preferably 0 or more, more preferably 1 or more; and is also an integer of preferably 20 or less, more preferably 10 or less and further preferably 5 or less. It is preferable that the average value of m in all structural units constituting a (meth)acrylate polymer is 0 to 10.

The (meth)acrylate polymer may be a homopolymer composed of a single structural unit selected from those represented by the formula (1), a copolymer composed of two or more structural units selected from those represented by the formula (1) or a copolymer composed of a structural unit represented by the formula (1) and another structural unit. If the (meth)acrylate polymer is a copolymer, compatibility with a refrigerant of a refrigerating machine oil is satisfied, at the same time, properties thereof such as lubricity, insulation properties and hygroscopicity can be further improved.

If the (meth)acrylate polymer is a copolymer, it is preferable that the copolymer has at least one structural unit selected from the structural units represented by the above formula (1) wherein $R^4$ is an alkyl group having 1 to 4 carbon atoms. This copolymer may have two or more structural units selected from structural units represented by the above formula (1) wherein $R^4$ is an alkyl group having 1 to 4 carbon atoms; or may have one or more structural units selected from the structural units represented by the above formula (1) wherein $R^4$ is an alkyl group having 1 to 4 carbon atoms and one or more structural units selected from the structural units represented by the above formula (1) wherein $R^4$ is an alkyl group having 5 to 8 carbon atoms or an organic group containing an oxygen atom. The content of the structural units represented by the above formula (1) wherein $R^4$ is an alkyl group having 1 to 4 carbon atoms based on the total amount of the structural units constituting the copolymer is preferably 50% by mole or more, more preferably 70% by mole or more, further preferably 80% by mole or more and particularly preferably 90% by mole or more.

Of the above copolymers, for example, the following copolymers (A) to (E) are suitable. Note that, $R^1$ to $R^4$ described in (A) to (E) respectively refer to $R^1$ to $R^4$ in the above formula (1).

(A) a copolymer having a structural unit wherein $R^1$ to $R^3$ are each a hydrogen atom and $R^4$ is an ethyl group; a structural unit wherein $R^1$ to $R^3$ are each a hydrogen atom and $R^4$ is a n-butyl group; and a structural unit wherein $R^1$ to $R^3$ each is a hydrogen atom and $R^4$ is an i-butyl group (2-methylpropyl group).

(B) a copolymer having a structural unit wherein $R^1$ to $R^3$ are each a hydrogen atom and $R^4$ is an ethyl group; and a structural unit wherein $R^1$ to $R^3$ are each a hydrogen atom and $R^4$ is a propyl group.

(C) a copolymer having a structural unit wherein $R^1$ and $R^3$ are each a hydrogen atom and $R^2$ and $R^4$ are each a methyl group; and a structural unit wherein $R^1$ to $R^3$ are each a hydrogen atom and $R^4$ is an i-octyl group (for example, 2-ethylhexyl group).

(D) a copolymer having a structural unit wherein $R^1$ to $R^3$ are each a hydrogen atom and $R^4$ is an ethyl group; and a structural unit wherein $R^1$ and $R^3$ are each a hydrogen atom; $R^2$ is a methyl group and $R^4$ is a glycidyl group.

(E) a copolymer having a structural unit wherein R to $R^3$ are each a hydrogen atom and $R^4$ is an i-butyl group (2-methylpropyl group); and a structural unit wherein $R^1$ and $R^3$ are each a hydrogen atom, $R^2$ is a methyl group and $R^4$ is a methoxyethyl group.

A (meth)acrylate polymer is produced by a known method described, for example, in International Publication No. WO01/083619. At this time, if the types of raw material monomers, the type of initiator, the ratio of structural units in a copolymer and the like are appropriately selected, the above refrigerating machine oil having desired properties can be obtained. Accordingly, a refrigerating machine oil satisfying requirements for properties such as lubricity and compatibility, which vary depending upon e.g., the compressor model in a refrigerating system or an air conditioning system, the material of the lubrication unit, refrigerating capacity and the type of refrigerant, can be obtained as desired. The copolymer may be either a block copolymer or a random copolymer.

The number average molecular weight (Mn) of a (meth)acrylate polymer is preferably 300 or more, more preferably 400 or more, further preferably 500 or more and particularly preferably 600 or more; and also preferably 3000 or less, more preferably 2000 or less, further preferably 1500 or less and particularly preferably 1000 or less. If the number average molecular weight is 300 or more, lubricity (in particular, antiwear property) in the presence of a predetermined refrigerant improves. If the number average molecular weight is 3000 or less, compatibility with a predetermined refrigerant improves.

In the (meth)acrylate polymer, the ratio of weight-average molecular weight (Mw) to number average molecular weight (Mn), i.e. Mw/Mn, is preferably 1.10 or more, more preferably 1.11 or more, further preferably 1.12 or more and particularly preferably 1.13 or more; and also preferably 2.00 or less, more preferably 1.90 or less, further preferably 1.80 or less and particularly preferably 1.70 or less. If the Mw/Mn is 1.10 or more, compatibility with a predetermined refrigerant improves. If the Mw/Mn is 2.00 or less, poor lubrication of a refrigerant compressor and inhibition of heat exchange in an evaporator can be suppressed. The weight-average molecular weight (Mw) of a (meth)acrylate polymer is appropriately selected such that Mn and Mw/Mn satisfy the above conditions.

In the present invention, the weight-average molecular weight (Mw), number average molecular weight (Mn) and the ratio of weight-average molecular weight (Mw) to number average molecular weight (Mn), i.e. Mw/Mn, refer to Mw, Mn and Mw/Mn (polystyrene (standard sample) equivalent) obtained by GPC analysis. Mw, Mn and Mw/Mn can be measured, for example, as follows.

Using tetrahydrofuran as a solvent, a sample is diluted to prepare a sample solution having a concentration of 1% by mass. The sample solution is subjected to analysis using a GPC apparatus (Waters Alliance2695). Using a column (an analyzable molecular weight of 100 to 10000) at a solvent flow-rate of 1 ml/min, analysis is carried out by a refractive index detector. Note that, using polystyrene whose molecular weight is known as a standard, the relationship between the column retention time and the molecular weight is separately obtained to prepare a calibration curve in advance. Based on the calibration curve, the molecular weight is determined from the obtained retention time.

The flash point of a (meth)acrylate polymer is preferably 195° C. or more, more preferably 200° C. or more and further preferably 205° C. or more. In the present invention, the flash point refers to a value measured in accordance with JIS K2265-4: 2007, "how to obtain flash point, part 4: Cleveland open cup".

The autoignition point of a (meth)acrylate polymer is preferably 335° C. or more, more preferably 340° C. or more and further preferably 345° C. or more. In the present invention, the autoignition point refers to a value measured in accordance with ASTM E659-1978.

The kinematic viscosity at 40° C. of a (meth)acrylate polymer is preferably 10 mm$^2$/s or more, more preferably 20 mm$^2$/s or more and further preferably 30 mm$^2$/s or more; and also preferably 400 mm$^2$/s or less, more preferably 300 mm$^2$/s or less and further preferably 200 mm$^2$/s or less. If the kinematic viscosity at 40° C. is the lower limit or more, lubricity and sealing of the compressor tend to improve. If the kinematic viscosity at 40° C. is the upper limit or less, the range of a composition exhibiting compatibility with a refrigerant in low temperature conditions is widen, with the result that poor lubrication of a refrigerant compressor and inhibition of heat exchange in an evaporator can be suppressed.

The kinematic viscosity at 100° C. of a (meth)acrylate polymer is preferably 1 mm$^2$/s or more, more preferably 2 mm$^2$/s or more and further preferably 3 mm$^2$/s or more; and also preferably 50 mm$^2$/s or less, more preferably 40 mm$^2$/s or less and further preferably 30 mm$^2$/s or less. If the kinematic viscosity at 100° C. is the lower limit or more, lubricity in the presence of a refrigerant improves. If the kinematic viscosity at 100° C. is the upper limit or less, the range of a composition exhibiting compatibility with a refrigerant is widen, with the result that poor lubrication of a refrigerant compressor and inhibition of heat exchange in an evaporator can be suppressed.

The viscosity index of a (meth)acrylate polymer is preferably 80 or more, more preferably 90 or more and further preferably 100 or more; and also preferably 200 or less, more preferably 180 or less and further preferably 150 or less. If the viscosity index is the lower limit or more, the lubricity (in particular, antiwear property) at high temperature in the presence of a predetermined refrigerant improves. If the viscosity index is the upper limit or less, the lubricity (in particular, antiwear property) in the presence of a predetermined refrigerant at low temperature improves.

In the present invention, kinematic viscosities at 40° C. and 100° C. and viscosity index refer to the values measured in accordance with JIS K-2283: 1993.

The pour point of a (meth)acrylate polymer is preferably −10° C. or less, more preferably −20° C. or less and preferably −50° C. or more. If a (meth)acrylate polymer having a pour point of −10° C. or less is used, solidification of the refrigerating machine oil in a refrigerant circulation system tends to be suppressed at low temperature. In the present invention, the pour point refers to the value measured in accordance with JIS K2269: 1987.

A refrigerating machine oil may contain a (meth)acrylate polymer alone and may further contain a base oil other than the (meth)acrylate polymer and/or additives. In the refrigerating machine oil, the content of a (meth)acrylate polymer is not particularly limited as long as the aforementioned excellent properties are not impaired; however, the content is preferably 50% by mass or more, more preferably 70% by mass or more, further preferably 80% by mass or more and particularly preferably 90% by mass or more based on the total amount of the refrigerating machine oil. If the content of a (meth)acrylate polymer is 50% by mass or more, suitability with a predetermined refrigerant can be more improved.

As the base oil other than a (meth)acrylate polymer, a mineral oil; a hydrocarbon-based oil such as an olefin polymer, a naphthalene compound and an alkylbenzene, an ester base oil (such as a monoester, a diester, a polyol ester); and a synthetic oil (oxygen-containing oil) constituted of a compound containing oxygen as a constituent element, such as a polyalkylene glycol, a polyvinyl ether, a ketone, a polyphenyl ether, a silicone, a polysiloxane and a perfluoro ether, can be used. As the oxygen containing oil, a polyol ester, a polyalkylene glycol and a polyvinyl ether are preferably used.

In order to obtain excellent properties required for a refrigerating machine oil such as lubricity, compatibility, thermal/chemical stability and electrical insulating property, the content of a base oil based on the total amount of the refrigerating machine oil is preferably 80% by mass or more, more preferably 90% by mass or more and further preferably 95% by mass or more.

Examples of the additive include an acid scavenger, an antioxidant, an extreme pressure agent, an oiliness agent, a defoaming agent, a metal deactivator, an antiwear agent, a viscosity index improver, a pour point depressant, a detergent-dispersant, a friction modifier and a rust inhibitor. The content of an additive(s) is preferably 5% by mass or less and more preferably 2% by mass or less, based on the total amount of the refrigerating machine oil.

Of the aforementioned additives, an acid scavenger is preferably further contained in the refrigerating machine oil in order to further improve thermal/chemical stability. Examples of the acid scavenger include an epoxy compound and a carbodiimide compound.

Examples of the epoxy compound include, but are not particularly limited to, a glycidyl ether epoxy compound, a glycidyl ester epoxy compound, an oxirane compound, an alkyloxirane compound, an alicyclic epoxy compound, an epoxidized fatty acid monoester and an epoxidized vegetable oil. These epoxy compounds can be used alone or in combination of two or more.

Examples of the glycidyl ether epoxy compound include n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decylglycidyl ether, undecylglycidyl ether, dodecylglycidyl ether, tridecylglycidyl ether, tetradecylglycidyl ether, 2-ethylhexylglycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether and polyalkylene glycol diglycidyl ether.

Examples of the glycidyl ester epoxy compound include glycidyl benzoate, glycidyl neodecanoate, glycidyl-2,2-dimethyl octanoate, glycidyl acrylate and glycidyl methacrylate.

The alicyclic epoxy compound is a compound having a partial structure represented by the following formula (3):

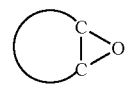

(3)

wherein carbon atoms constituting an epoxy group directly constitute an alicyclic ring.

Examples of the alicyclic epoxy compound include 1,2-epoxycyclohexane, 1,2-epoxycyclopentane, 3',4'-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-3-yl)-spiro(1,3-dioxane-5,3'-[7]oxabicyclo[4.1.0] heptane, 4-(1'-methylepoxyethyl)-1,2-epoxy-2-methylcyclohexane and 4-epoxyethyl-1,2-epoxycyclohexane.

Examples of the allyl oxirane compound include 1,2-epoxy styrene and alkyl-1,2-epoxy styrene.

Examples of the alkyl oxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane and 1,2-epoxyeicosane.

Examples of the epoxidized fatty acid monoester include an ester of an epoxidized fatty acid having 12 to 20 carbon atoms and an alcohol having 1 to 8 carbon atoms, phenol or an alkylphenol. As the epoxidized fatty acid monoester, butyl, hexyl, benzyl, cyclohexyl, methoxyethyl, octyl, phenyl and butylphenyl esters of epoxystearate are preferably used.

Examples of the epoxidized vegetable oil include epoxy compounds of vegetable oils such as soybean oil, linseed oil and cottonseed oil.

As the carbodiimide compound, which is not particularly limited, dialkylcarbodiimide, diphenyl carbodiimide and bis(alkylphenyl) carbodiimide can be used. Examples of the dialkylcarbodiimide include diisopropylcarbodiimide and dicyclohexylcarbodiimide. Examples of the bis(alkylphenyl) carbodiimide include ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide and bis(nonylphenyl)carbodiimide.

Of the additives, a wear inhibitor is preferably further contained in a refrigerating machine oil. Preferable examples of the wear inhibitor include phosphorates, thiophosphates, sulfide compounds and zinc dialkyldithiophosphates. Of the phosphates, triphenyl phosphate (TPP) and tricresyl phosphate (TCP) are preferable. Of the thiophosphates, triphenylphosphorothionate (TPPT) is preferable. Examples of the sulfide compounds include many compounds; however, a monosulfide compound is preferable since it can ensure the stability of a refrigerating machine oil and can suppress deterioration of copper used in a refrigerating machine.

Of the above additives, an antioxidant is preferably further contained in a refrigerating machine oil. Examples of the antioxidant include phenolic compounds such as di-tert-butyl-p-cresol and amine compounds such as alkyl diphenylamine. In particular, a phenolic compound is preferably contained as an antioxidant in a refrigerating machine oil in an amount of 0.02% by mass or more and 0.5% by mass or less, based on the total amount of the refrigerating machine oil.

Of the above additives, a friction modifier, an extreme pressure agent, a rust inhibitor, a metal deactivator and a defoaming agent are preferably further contained in a refrigerating machine oil. Examples of the friction modifier include an aliphatic amine, an aliphatic amide, an aliphatic imide, an alcohol, an ester, a phosphate amine salt and a phosphite amine salt. Examples of the extreme pressure agent include a sulfurized olefin and a sulfurized fat and oil. Examples of the rust inhibitor include an ester or partial ester of an alkenyl succinic acid. Examples of the metal deactivator include benzotriazole and a benzotriazole derivative. Examples of the defoaming agent include a silicone compound and a polyester compound.

The kinematic viscosity at 40° C. of a refrigerating machine oil, which is not particularly limited, is preferably 3 mm$^2$/s or more, more preferably 4 mm$^2$/s or more and further preferably 5 mm$^2$/s or more; and also preferably 1000 mm$^2$/s or less, more preferably 500 mm$^2$/s or less and further preferably 400 mm$^2$/s or less. The kinematic viscosity at 100° C. of a refrigerating machine oil, which is not particularly limited, is preferably 1 mm$^2$/s or more, more preferably 2 mm$^2$/s or more and further preferably 3 mm$^2$/s or more; and also preferably 100 mm$^2$/s or less, more preferably 50 mm$^2$/s or less and further preferably 30 mm$^2$/s or less.

The moisture content of a refrigerating machine oil, which is not particularly limited, is preferably 500 ppm or less based on the total amount of the refrigerating machine oil, more preferably 300 ppm or less and further preferably 200 ppm or less. If a refrigerating machine oil is used particularly in a closed-type refrigerating machine, in consideration of the thermal/chemical stability of a refrigerating machine oil and the effect on electrical insulating properties, the moisture content is preferably low.

The acid value of a refrigerating machine oil, which is not particularly limited, is preferably 1.0 mgKOH/g or less and more preferably 0.1 mgKOH/g or less, in order to prevent corrosion of the metal used in a refrigerating machine or piping and prevent decomposition of esters contained in the refrigerating machine oil of the embodiment. In the present invention, the acid value refers to a value measured in accordance with JIS K2501: 2003, "Petroleum products and lubricants-neutralization value test method".

The ash content of a refrigerating machine oil, which is not particularly limited, is preferably 100 ppm or less and more preferably 50 ppm or less in order to enhance the thermal/chemical stability of a refrigerating machine oil and suppress generation of e.g., sludge. In the present invention, the ash content refers to a value measured in accordance with JIS K2272: 1998, "Crude oil and petroleum products-ash and sulfuric ash test method".

A composition containing a (meth)acrylate polymer and a composition containing a (meth)acrylate polymer and the aforementioned additives are suitably used as a constitutional component of a refrigerating machine oil, which is to be used with a refrigerant selected from difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, an unsaturated hydrofluorocarbon, a hydrocarbon and carbon dioxide, or as a constitutional component of a working fluid composition for a refrigerating machine containing the refrigerating machine oil and a refrigerant selected from difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, an unsaturated hydrofluorocarbon, a hydrocarbon and carbon dioxide.

A (meth)acrylate polymer and the aforementioned additives are suitably used for producing a refrigerating machine oil to be used with a refrigerant selected from difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, an unsaturated hydrofluorocarbon, a hydrocarbon and carbon dioxide, or a working fluid composition for a refrigerating machine containing the refrigerating machine oil and a refrigerant selected from difluoromethane, a mixture of difluoromethane and pentafluoroethane, a mixture of difluoromethane, pentafluoroethane and 1,1,1,2-tetrafluoro ethane, a mixture of pentafluoroethane, 1,1,1,2-tetrafluoroethane and 1,1,1-trifluoroethane, an unsaturated hydrofluorocarbon, a hydrocarbon and carbon dioxide.

The refrigerant to be used with a refrigerating machine oil and the refrigerant contained in a working fluid composition for a refrigerating machine are selected from difluoromethane (R32), a mixture of difluoromethane (R32) and pentafluoroethane (R125), a mixture of difluoromethane (R32), pentafluoroethane (R125), 1,1,1,2-tetrafluoroethane (R134a), a mixture of pentafluoroethane (R125), 1,1,1,2-tetrafluoroethane (R134a) and 1,1,1-trifluoroethane (R143a), an unsaturated fluorinated hydrocarbon, a hydrocarbon and carbon dioxide. The refrigerant may be one or two or more selected from the above. The content of the refrigerant selected from the above is preferably 60 to 100% by mass based on the total amount of the refrigerant and more preferably 80 to 100% by mass.

In the mixture of difluoromethane (R32) and pentafluoroethane (R125), the mass ratio (R32/R125) can be controlled to fall within the range of, for example, 40 to 70/60 to 30. Of these, a mixture having a mass ratio (R32/R125) of 60/40, a mixture (R410A) having a mass ratio of 50/50 and a mixture (R410B) having a mass ratio of 45/55 are suitably used.

In the mixture of difluoromethane (R32) pentafluoroethane (R125) and 1,1,1,2-tetrafluoroethane (R134a), the mass ratio (R32/R125/R134a) can be controlled to fall within the range of, for example, 15 to 35/5 to 40/40 to 70. Of these, a mixture having a mass ratio (R32/R125/R134a) of 30/10/60, a mixture (R407C) having a mass ratio of 23/25/52 and a mixture (R407E) having a mass ratio of 25/15/60 are suitably used.

In the mixture of pentafluoroethane (R125), 1,1,1,2-tetrafluoroethane (R134a) and 1,1,1-trifluoroethane (R143a), the mass ratio (R125/R134a/R143a) can be controlled to fall within the range of, for example, 35 to 55/1 to 15/40 to 60. Of these, a mixture (R404A) having a mass ratio (R125/R134a/R143a) of 44/4/52 is suitably used.

As a refrigerant, i.e., an unsaturated fluorinated hydrocarbon (HFO), fluoropropene having 3 to 5 fluorine atoms is preferable and at least one element or a mixture of two or more elements selected from, 1,2,3,3,3-pentafluoropropene (HFO-1225ye), 1,3,3,3-tetrafluoropropenes (HFO-1234ze), 2,3,3,3-tetrafluoropropenes (HFO-1234yf), 1,2,3,3-tetrafluoropropenes (HFO-1234ye) and 3,3,3-trifluoropropenes (HFO-1243zf) is preferable. In view of physical properties of a refrigerant, at least one element or a mixture of two or more elements selected from HFO-1225ye, HFO-1234ze and HFO-1234yf, is preferable.

The hydrocarbon refrigerant is preferably a hydrocarbon having 1 to 5 carbon atoms. More specifically, examples of the hydrocarbon refrigerant include methane, ethylene, ethane, propylene, propane (R290), cyclopropane, n-butane, isobutane, cyclobutane, methyl cyclopropane, 2-methylbutane, n-pentane or a mixture of two types or more of these. Of these, a substance present in a gaseous state at 25° C., 1 atm is preferably used, and propane, n-butane, isobutane, 2-methylbutane or a mixture of these, is preferable.

In addition to the above refrigerant, another refrigerant may be used appropriately in combination. Examples of the "another refrigerant" include another saturated fluorinated hydrocarbon refrigerant, a fluorinated ether refrigerant such as perfluoro ether, a bis(trifluoromethyl) sulfide refrigerant, trifluoroiodomethane refrigerant and a natural refrigerant such as ammonia.

Examples of the "another saturated fluorinated hydrocarbon refrigerant" include a saturated fluorinated hydrocarbon having 1 to 3 and preferably 1 to 2 carbon atoms. More specifically, examples of the saturated fluorinated hydrocarbon include a single substance or a mixture of two or more substances selected from pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa) and 1,1,1,3,3-pentafluorobutane (R365mfc).

A refrigerating machine oil is usually mixed with a refrigerant and present in the form of a working fluid composition for a refrigerating machine in refrigerating air conditioning machines. The content of a refrigerating machine oil in the working fluid composition for a refrigerating machine, which is not particularly limited, is 1 part by mass or more, more preferably 2 parts by mass or more; and also preferably 500 parts by mass or less and more preferably 400 parts by mass or less based on 100 parts by mass of the refrigerant.

The refrigerating machine oil and working fluid composition for a refrigerating machine are suitably used in air-conditioners having a reciprocating or rotary hermetic compressor, refrigerators, open or closed type car air-conditioners, dehumidifiers, water heaters, freezers, refrigerated warehouses, vending machines, showcases, cooling systems for chemical plants and machines having a centrifugal compressor.

EXAMPLES

Now, the present invention will more specifically described by way of Examples; however, the present invention is not limited to the following Examples.

Base oils having compositions and properties shown in Tables 1 to 3 were used. The abbreviations in Tables 1 to 3 represent the following monomers.

AC2: ethyl acrylate
AnC4: n-butyl acrylate
AiC4: 2-methylpropyl acrylate
AC3: propyl acrylate
MC1: methyl methacrylate
AiC8: 2-ethylhexyl acrylate
MG: glycidyl methacrylate
MMOE: methoxyethyl methacrylate
AEOM: ethoxymethyl acrylate Properties of individual base oils were evaluated by the following methods.

Mn, Mw/Mn: Using tetrahydrofuran as a solvent, a sample was diluted to prepare a sample solution having a concentration of 1% by mass. The sample solution was subjected to analysis by a GPC apparatus (Waters Alliance2695). Using a column (an analyzable molecular weight of 100 to 10000) at a solvent flow-rate of 1 ml/min, analysis was carried out by a refractive index detector. Note that, using polystyrene whose molecular weight was known, as a standard, the relationship between the column retention time and the molecular weight was separately obtained to prepare a calibration curve in advance. Based on the calibration curve, the molecular weight was determined from the obtained retention time.

Kinematic viscosity and viscosity index: JIS K2283: 1993
Pour point: JIS K2269: 1987
Flash point: JIS K2265-4: 2007
Autoignition point: ASTM E659-1978

TABLE 1

| | Base oil 1 | Base oil 2 | Base oil 3 | Base oil 4 | Base oil 5 |
| --- | --- | --- | --- | --- | --- |
| Mn | 530 | 1000 | 750 | 1510 | 2950 |
| Mw/Mn | 1.98 | 1.70 | 1.11 | 1.50 | 1.81 |
| Type of monomer | AC2 | AnC4 | AiC4 | AC2/AnC4/AiC4 | AC2/AC3 |

TABLE 1-continued

|  | Base oil 1 | Base oil 2 | Base oil 3 | Base oil 4 | Base oil 5 |
|---|---|---|---|---|---|
| Molar ratio of monomers | 100 | 100 | 100 | 80/10/10 | 20/80 |
| Kinematic viscosity 40° C. [mm$^2$/s] | — | 150.4 | — | — | — |
| Kinematic viscosity 100° C. [mm$^2$/s] | — | 17.1 | — | — | — |
| Viscosity index | — | 124 | — | — | — |
| Pour point [° C.] | <−45 | −45 | <−45 | −40 | −35 |
| Flash point [° C.] | 231 | 240 | 235 | 251 | 263 |
| Autoignition point [° C.] | 379 | 390 | 381 | 402 | 412 |

TABLE 2

|  | Base oil 6 | Base oil 7 | Base oil 8 | Base oil 9 | Base oil 10 |
|---|---|---|---|---|---|
| Mn | 310 | 400 | 630 | 1300 | 2060 |
| Mw/Mn | 1.75 | 1.23 | 1.52 | 1.31 | 1.88 |
| Type of monomer | MC1 | MC1/AiC8 | MG/AC2 | MMOE/AiC4 | AEOM |
| Molar ratio of monomers | 100 | 80/20 | 10/90 | 50/50 | 100 |
| Kinematic viscosity 40° C. [mm$^2$/s] | — | — | — | — | — |
| Kinematic viscosity 100° C. [mm$^2$/s] | — | — | — | — | — |
| Viscosity index | — | — | — | — | — |
| Pour point [° C.] | <−45 | <−45 | <−45 | −40 | −35 |
| Flash point [° C.] | 242 | 246 | 250 | 257 | 259 |
| Autoignition point [° C.] | 387 | 391 | 399 | 387 | 393 |

TABLE 3

|  | Base oil 11 | Base oil 12 | Base oil 13 | Base oil 14 |
|---|---|---|---|---|
| Mn | 290 | 3060 | 1000 | 1510 |
| Mw/Mn | 1.25 | 1.75 | 2.08 | 2.12 |
| Type of monomer | AC2/AnC4/AiC4 | AC2/AnC4/AiC4 | AC2/AnC4/AiC4 | AC2/AnC4/AiC4 |
| Molar ratio of monomers | 80/10/10 | 80/10/10 | 80/10/10 | 80/10/10 |
| Kinematic viscosity 40° C. [mm$^2$/s] | — | — | — | — |
| Kinematic viscosity 100° C. [mm$^2$/s] | — | — | — | — |
| Viscosity index | — | — | — | — |
| Pour point [° C.] | <−45 | −25 | −40 | −40 |
| Flash point [° C.] | 238 | 261 | 220 | 229 |
| Autoignition point [° C.] | 389 | 397 | 363 | 371 |

Using the aforementioned individual base oils and the following additives, refrigerating machine oils having compositions shown in Tables 4 to 7 were prepared. Individual refrigerating machine oils were subjected to the refrigerant compatibility test and antiwear property test shown below. The results are shown in Tables 4 to 7.

Additive 1: 2,6-di-tert-butyl-p-cresol
Additive 2: Tricresyl phosphate
Additive 3: Glycidyl neodecanoate
Additives 4: 2-ethylhexyl glycidyl ether (Refrigerant Compatibility Test)

In accordance with JIS K2211: 2009 "Test method for compatibility with refrigerant" of "refrigerating machine oil", 10 g of a refrigerating machine oil was blended with 10 g of a difluoromethane/pentafluoroethane mixture (mass ratio 50/50) (R410A), difluoromethane (R32), 2,3,3,3-tetrafluoropropene (HFO-1234yf), propane (R290) or carbon dioxide ($CO_2$), and then whether a refrigerant and the refrigerating machine oil were mutually dissolved at 0° C. was observed. Note that, in the Tables, "compatible" means that a refrigerant and the refrigerating machine oil were mutually dissolved; whereas, "separation" means that a refrigerant and the refrigerating machine oil are separated into two layers.

(Antiwear Property Test)

An antiwear property test was performed using a hyperbaric-atmosphere friction tester (system of rotation sliding of a rotating vane material and a fixed disk material) manufactured by SHINKO ENGINEERING CO., LTD., in the same atmosphere of a refrigerant as created by a practical compressor. As the test condition, any one of the following antiwear property tests-(1) to (5), which varied depending upon the type of refrigerant, was employed.

Antiwear property test-(1): R410A is used as a refrigerant and the test vessel pressure is 1.6 MPa.

Antiwear property test-(2): R32 is used as a refrigerant and the test vessel pressure is 1.6 MPa.

Antiwear property test-(3): HIFO-1234yf is used as a refrigerant and the test vessel pressure is 1.6 MPa.

Antiwear property test-(4): n-hexane (added at 20% by volume relative to a refrigerating machine oil; and used as an alternative refrigerant because a hydrocarbon refrigerant such as R290 has security fear) is used as a refrigerant and the test vessel pressure is controlled to be slightly higher than atmospheric pressure.

Antiwear property test-(5): $CO_2$ is used as a refrigerant and the test vessel pressure is 1.6 MPa.

All antiwear property tests-(1) to (5) were carried out in common conditions: an oil quantity of 600 ml, a test temperature of 90° C., a rotational speed of 550 rpm, a load of 90 kgf, and test time of one hour; and using SKH-51 as the vane material and FC250 as the disk material. The antiwear property was evaluated based on the wear depth of the vane material since the amount of wear of the disk material was extremely low.

TABLE 4

|  |  | Example 1 | Example 2 | Example 3 | Example 4 | Example 5 |
|---|---|---|---|---|---|---|
| Composition (mass % based on total amount of refrigerating machine oil) | Base oil 1 | 100 | — | — | — | — |
|  | Base oil 2 | — | 100 | — | — | — |
|  | Base oil 3 | — | — | 100 | — | — |
|  | Base oil 4 | — | — | — | 100 | — |
|  | Base oil 5 | — | — | — | — | 100 |
| Refrigerant |  | R410A | R410A | R410A | R410A | R410A |
| Refrigerant compatibility test |  | Compatible | Compatible | Compatible | Compatible | Compatible |
| Antiwear property test (wear depth, μm) |  | 9.3 | 8.1 | 7.3 | 6.6 | 5.9 |

TABLE 4-continued

|  | Example 1 | Example 2 | Example 3 | Example 4 | Example 5 |
|---|---|---|---|---|---|
| Refrigerant | R32 | R32 | R32 | R32 | R32 |
| Refrigerant compatibility test | Compatible | Compatible | Compatible | Compatible | Compatible |
| Antiwear property test (wear depth, μm) | 10.1 | 8.5 | 8.4 | 7.6 | 7.1 |
| Refrigerant | HFO-1234yf | HFO-1234yf | HFO-1234yf | HFO-1234yf | HFO-1234yf |
| Refrigerant compatibility test | Compatible | Compatible | Compatible | Compatible | Compatible |
| Antiwear property test (wear depth, μm) | 12.2 | 9.1 | 7.8 | 8.3 | 8.5 |
| Refrigerant | R290 | R290 | R290 | R290 | R290 |
| Refrigerant compatibility test | Compatible | Compatible | Compatible | Compatible | Compatible |
| Antiwear property test (wear depth, μm) | 11.8 | 9.2 | 6.5 | 7.5 | 7.9 |
| Refrigerant | $CO_2$ | $CO_2$ | $CO_2$ | $CO_2$ | $CO_2$ |
| Refrigerant compatibility test | Compatible | Compatible | Compatible | Compatible | Compatible |
| Antiwear property test (wear depth, μm) | 10.1 | 7.4 | 8.8 | 9.1 | 9.9 |

TABLE 5

|  |  | Example 6 | Example 7 | Example 8 | Example 9 | Example 10 |
|---|---|---|---|---|---|---|
| Composition (mass % based on total amount of refrigerating machine oil) | Base oil 6 | 100 | — | — | — | — |
|  | Base oil 7 | — | 100 | — | — | — |
|  | Base oil 8 | — | — | 100 | — | — |
|  | Base oil 9 | — | — | — | 100 | — |
|  | Base oil 10 | — | — | — | — | 100 |
| Refrigerant |  | R410A | R410A | R410A | R410A | R410A |
| Refrigerant compatibility test |  | Compatible | Compatible | Compatible | Compatible | Compatible |
| Antiwear property test (wear depth, μm) |  | 14.1 | 10.3 | 9.5 | 8.2 | 7.1 |
| Refrigerant |  | R32 | R32 | R32 | R32 | R32 |
| Refrigerant compatibility test |  | Compatible | Compatible | Compatible | Compatible | Compatible |
| Antiwear property test (wear depth, μm) |  | 13.2 | 11.4 | 10.1 | 9.3 | 8.1 |
| Refrigerant |  | HFO-1234yf | HFO-1234yf | HFO-1234yf | HFO-1234yf | HFO-1234yf |
| Refrigerant compatibility test |  | Compatible | Compatible | Compatible | Compatible | Compatible |
| Antiwear property test (wear depth, μm) |  | 15.7 | 12.1 | 9.5 | 8.9 | 7.3 |
| Refrigerant |  | R290 | R290 | R290 | R290 | R290 |
| Refrigerant compatibility test |  | Compatible | Compatible | Compatible | Compatible | Compatible |
| Antiwear property test (wear depth, μm) |  | 11.9 | 9.8 | 8.9 | 9.1 | 7.7 |
| Refrigerant |  | $CO_2$ | $CO_2$ | $CO_2$ | $CO_2$ | $CO_2$ |
| Refrigerant compatibility test |  | Compatible | Compatible | Compatible | Compatible | Compatible |
| Antiwear property test (wear depth, μm) |  | 10.8 | 9.9 | 9.1 | 10.0 | 8.5 |

TABLE 6

|  |  | Example 11 | Example 12 | Example 13 |
|---|---|---|---|---|
| Composition (mass % based on total amount of refrigerating machine oil) | Base oil 1 | Remainder | — | — |
|  | Base oil 2 | — | Remainder | — |
|  | Base oil 3 | — | — | Remainder |
|  | Additive 1 | 0.3 | 0.1 | 1.0 |
|  | Additive 2 | 0.5 | 0.2 | 1.0 |
|  | Additive 3 | 0.5 | 1.0 | — |
|  | Additive 4 | 0.5 | — | — |
| Refrigerant |  | R410A | R410A | R410A |
| Refrigerant compatibility test |  | Compatible | Compatible | Compatible |
| Antiwear property test (wear depth, μm) |  | 8.2 | 8.1 | 5.5 |
| Refrigerant |  | R32 | R32 | R32 |
| Refrigerant compatibility test |  | Compatible | Compatible | Compatible |
| Antiwear property test (wear depth, μm) |  | 8.1 | 8.1 | 6.7 |
| Refrigerant |  | HFO-1234yf | HFO-1234yf | HFO-1234yf |
| Refrigerant compatibility test |  | Compatible | Compatible | Compatible |
| Antiwear property test (wear depth, μm) |  | 10.2 | 8.8 | 6.5 |

TABLE 6-continued

|  | Example 11 | Example 12 | Example 13 |
|---|---|---|---|
| Refrigerant | R290 | R290 | R290 |
| Refrigerant compatibility test | Compatible | Compatible | Compatible |
| Antiwear property test (wear depth, μm) | 10.8 | 8.9 | 5.2 |
| Refrigerant | $CO_2$ | $CO_2$ | $CO_2$ |
| Refrigerant compatibility test | Compatible | Compatible | Compatible |
| Antiwear property test (wear depth, μm) | 7.1 | 7.1 | 6.4 |

TABLE 7

|  |  | Comparative Example 1 | Comparative Example 2 | Comparative Example 3 | Comparative Example 4 |
|---|---|---|---|---|---|
| Composition (mass % based on total amount of refrigerating machine oil) | Base oil 11 | 100 | — | — | — |
| | Base oil 12 | — | 100 | — | — |
| | Base oil 13 | — | — | 100 | — |
| | Base oil 14 | — | — | — | 100 |
| Refrigerant | | R410A | R410A | R410A | R410A |
| Refrigerant compatibility test | | Compatible | Separation | Compatible | Compatible |
| Antiwear property test (wear depth, μm) | | 18.1 | 5.3 | 9.1 | 6.9 |
| Refrigerant | | R32 | R32 | R32 | R32 |
| Refrigerant compatibility test | | Compatible | Separation | Separation | Separation |
| Antiwear property test (wear depth, μm) | | 17.1 | 6.4 | 9.3 | 8.8 |
| Refrigerant | | HFO-1234yf | HFO-1234yf | HFO-1234yf | HFO-1234yf |
| Refrigerant compatibility test | | Compatible | Separation | Compatible | Separation |
| Antiwear property test (wear depth, μm) | | 21.5 | 7.2 | 9.5 | 9.9 |
| Refrigerant | | R290 | R290 | R290 | R290 |
| Refrigerant compatibility test | | Compatible | Separation | Separation | Separation |
| Antiwear property test (wear depth, μm) | | 16.9 | 8.3 | 8.9 | 8.5 |
| Refrigerant | | $CO_2$ | $CO_2$ | $CO_2$ | $CO_2$ |
| Refrigerant compatibility test | | Compatible | Separation | Compatible | Compatible |
| Antiwear property test (wear depth, μm) | | 15.3 | 9.1 | 8.3 | 10.0 |

The invention claimed is:

1. A working fluid composition for a refrigerating machine comprising:
    a refrigerating machine oil comprising, as a base oil, a polymer having a structural unit represented by the following formula (1):

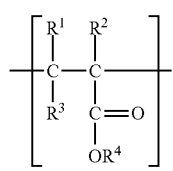

(1)

wherein $R^1$, $R^2$ and $R^3$, which may be the same as or different from each other, represent a hydrogen atom or a hydrocarbon group; and $R^4$ represents a hydrocarbon group or an organic group containing an oxygen atom, and
    having a number average molecular weight Mn of 300 or more and 3000 or less and a ratio of a weight-average molecular weight Mw to a number average molecular weight Mn (Mw/Mn) of 1.10 or more and 2.00 or less; and
    a refrigerant selected from the group consisting of difluoromethane, a mixture of difluoromethane and pentafluoroethane, a mixture of difluoromethane, pentafluoroethane and 1,1,1,2-tetrafluoroethane, a mixture of pentafluoroethane, 1,1,1,2-tetrafluoroethane and 1,1,1-trifluoroethane, unsaturated hydrofluorocarbons, hydrocarbons and carbon dioxide.

2. The working fluid composition for a refrigerating machine according to claim 1, wherein —$OR^4$ in the formula (1) is represented by the following formula (2):

$$—O(R^5O)_mR^6 \quad (2)$$

wherein $R^5$ represents a divalent hydrocarbon group or a divalent hydrocarbon group containing an ether-bond oxygen atom; $R^6$ represents a hydrocarbon group; and m represents an integer of 0 or more; with the proviso that if m is 2 or more, a plurality of $R^5$ may be the same as or different from each other.

3. The working fluid composition for a refrigerating machine according to claim 1, wherein the polymer has the structural unit wherein $R^1$ to $R^3$ are each a hydrogen atom and $R^4$ is 2-methylpropyl group.

4. The working fluid composition for a refrigerating machine according to claim 3, wherein the refrigerant is selected from the group consisting of difluoromethane, a mixture of difluoromethane and pentafluoroethane, unsaturated hydrofluorocarbons, and hydrocarbons.

5. The working fluid composition for a refrigerating machine according to claim 1, wherein the polymer has
    the structural unit wherein $R^1$ to $R^3$ are each a hydrogen atom and $R^4$ is ethyl group,
    the structural unit wherein $R^1$ to $R^3$ are each a hydrogen atom and $R^4$ is n-butyl group, or
    the structural unit wherein $R^1$ to $R^3$ are each a hydrogen atom and $R^4$ is 2-methylpropyl group.

6. The working fluid composition for a refrigerating machine according to claim 5, wherein the refrigerant is selected from the group consisting of difluoromethane, a mixture of difluoromethane and pentafluoroethane, unsaturated hydrofluorocarbons, and hydrocarbons.

7. The working fluid composition for a refrigerating machine according to claim 1, wherein the polymer has the structural unit wherein $R^1$ to $R^3$ are each a hydrogen atom and $R^4$ is ethyl group, or the structural unit wherein $R^1$ to $R^3$ are each a hydrogen atom and $R^4$ is propyl group.

8. The working fluid composition for a refrigerating machine according to claim 7, wherein the refrigerant is selected from the group consisting of difluoromethane, a mixture of difluoromethane and pentafluoroethane, unsaturated hydrofluorocarbons, and hydrocarbons.

9. The working fluid composition for a refrigerating machine according to claim 1, wherein the polymer has the structural unit wherein $R^1$ to $R^3$ are each a hydrogen atom and $R^4$ is ethoxymethyl group.

10. The working fluid composition for a refrigerating machine according to claim 9, wherein the refrigerant is selected from the group consisting of difluoromethane, a mixture of difluoromethane and pentafluoroethane, unsaturated hydrofluorocarbons, and hydrocarbons.

* * * * *